(12) United States Patent
Hsu et al.

(10) Patent No.: US 7,656,597 B2
(45) Date of Patent: *Feb. 2, 2010

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 79 days.

This patent is subject to a terminal disclaimer.

(21) Appl. No.: 11/949,059

(22) Filed: Dec. 3, 2007

(65) Prior Publication Data

US 2009/0073565 A1    Mar. 19, 2009

(30) Foreign Application Priority Data

Sep. 17, 2007    (CN)    .................. 2007 1 0201741

(51) Int. Cl.
  *G02B 5/04*    (2006.01)
  *F21V 7/04*    (2006.01)
(52) U.S. Cl. .................. 359/831; 359/599; 362/620; 362/626
(58) Field of Classification Search .................. 359/599, 359/707, 831; 362/620–626
See application file for complete search history.

(56) References Cited

U.S. PATENT DOCUMENTS

| | | | | | |
|---|---|---|---|---|---|
| 3,716,710 | A | * | 2/1973 | Clostermann et al. | 362/339 |
| 3,764,800 | A | * | 10/1973 | Clostermann | 362/330 |
| 4,851,164 | A | * | 7/1989 | Hayashi | 264/1.36 |
| 6,275,338 | B1 | * | 8/2001 | Arai et al. | 359/599 |
| 2002/0145860 | A1 | | 10/2002 | Lee | |
| 2006/0172119 | A1 | * | 8/2006 | Hayashi et al. | 428/156 |
| 2007/0014034 | A1 | * | 1/2007 | Lee et al. | 359/707 |

FOREIGN PATENT DOCUMENTS

| | | |
|---|---|---|
| CN | 1504776 A | 6/2004 |
| JP | 7-114025 | 5/1995 |

\* cited by examiner

*Primary Examiner*—Thong Nguyen
(74) *Attorney, Agent, or Firm*—Frank R. Niranjan (57) ABSTRACT

An exemplary prism sheet includes a transparent main body. The main body includes a first surface, a second surface opposite to the first surface, a plurality of spherical depressions formed in the first surface, and a plurality of triangular pyramidal depressions and hexagonal pyramidal depressions formed in the second surface. Each of the triangular pyramidal depressions is surrounded by three adjacent hexagonal pyramidal depressions. A backlight module using the present prism sheet is also provided.

18 Claims, 7 Drawing Sheets

PRISM SHEET AND BACKLIGHT MODULE USING THE SAME

CROSS-REFERENCE TO RELATED APPLICATIONS

This application is related to seven co-pending U.S. patent applications, which are: applications Ser. No. 11/938,307 and Ser. No. 11/938,308, filed on Nov. 12, 2007, and both entitled "PRISM SHEET AND BACKLIGHT MODULE USING THE SAME"; application Ser. No. 11/940,328, filed on Nov. 15, 2007, and entitled "PRISM SHEET AND BACKLIGHT MODULE USING THE SAME", application Ser. No. 11/946,866 and Ser. No. 11/946,867, filed on Nov. 12, 2007, and both entitled "PRISM SHEET AND BACKLIGHT MODULE USING THE SAME", and application Ser. No. 11/949,060, and Ser. No. 11/949,058, both filed on Dec. 3, 2007, and both entitled "PRISM SHEET AND BACKLIGHT MODULE USING THE SAME". In the co-pending application, the inventors are Tung-Ming Hsu and Shao-Han Chang. The co-pending application has the same assignee as the present application. The disclosure of the above identified application is incorporated herein by reference.

BACKGROUND OF THE INVENTION

1. Field of the Invention

The present invention relates to prisms, and particularly, to a prism sheet used in a backlight module.

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

Figure 5:
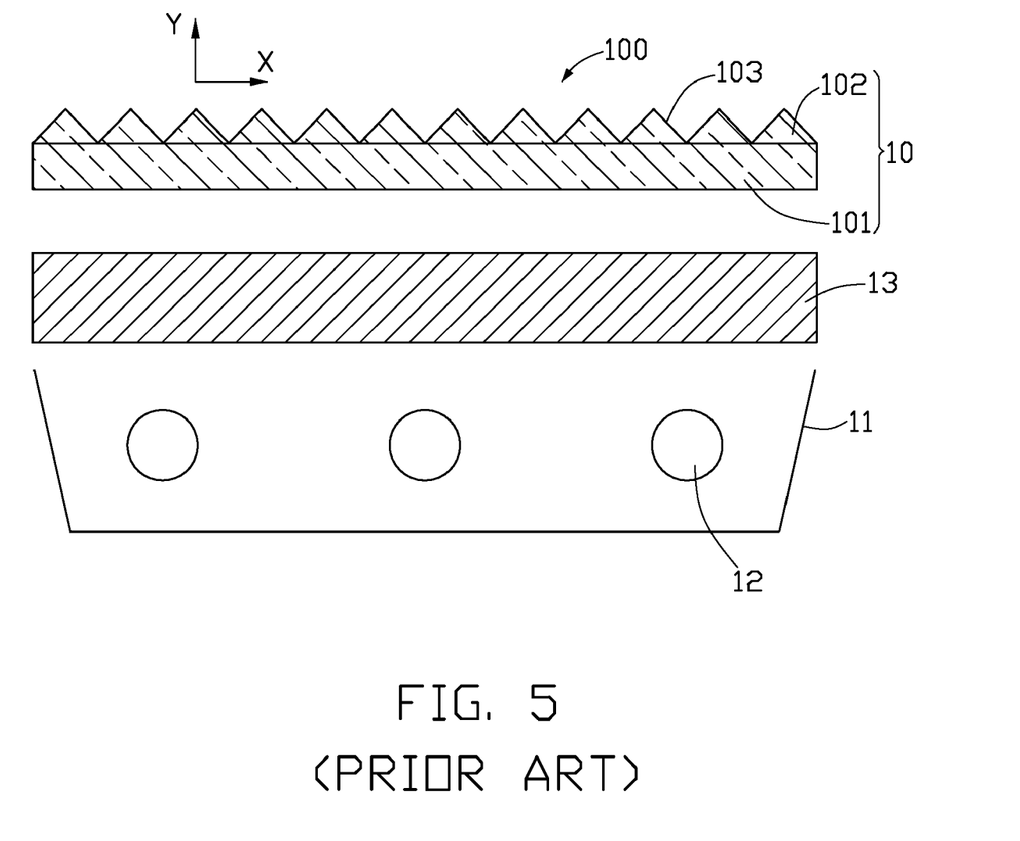
FIG. 5 is a side cross-sectional view of a conventional backlight module employing a typical prism sheet.

FIG. 5 depicts a typical direct type backlight module 100. The backlight module 100 includes a housing 11, a plurality of lamps 12 above a base of the housing 11 for emitting light, and a light diffusion plate 13 and a prism sheet 10 stacked on top of the housing 11 in that order. An interior of the housing 11 is configured for reflecting light upwards. The light diffusion plate 13 includes a plurality of dispersion particles (not shown) therein. The dispersion particles are configured for scattering light, thus enhancing the uniformity of light exiting the light diffusion plate 13.

Figure 6:
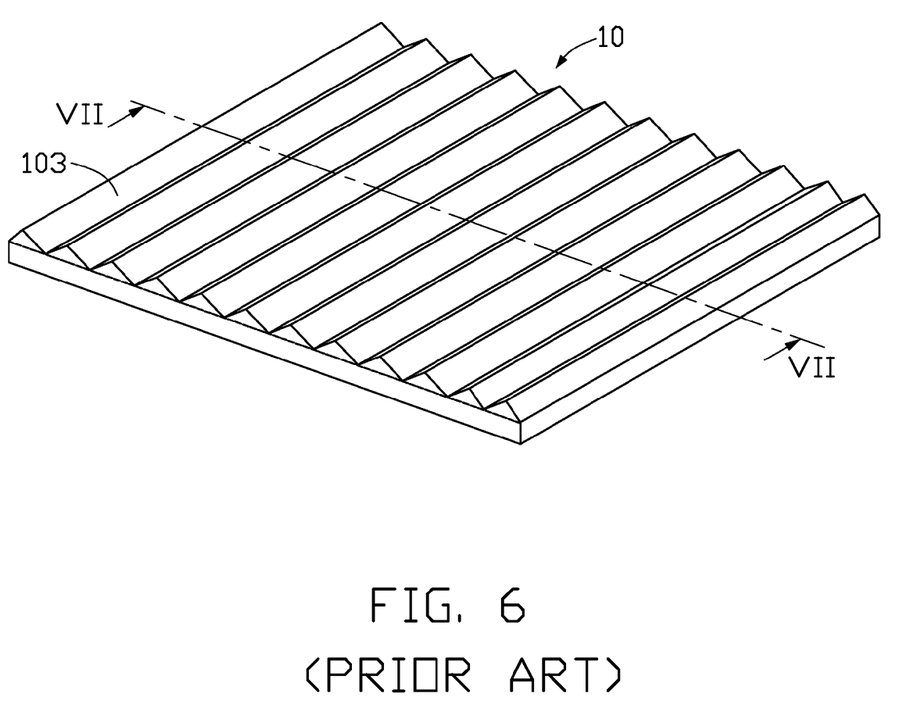
FIG. 6 is an isometric view of the prism sheet shown in FIG. 5.

Referring to FIGS. 5 and 6, the prism sheet 10 includes a base layer 101 and a prism layer 102 formed on the base layer 101. The prism layer 102 contains a plurality of parallel prism lenses 103 having a triangular cross-section. The prism lenses 103 are configured for collimating light to a certain extent. Typically, a method of manufacturing the prism sheet 10 includes the following steps: first, a melted ultraviolet-cured transparent resin is coated on the base layer 101 to form V-shaped lenses, then the melted ultraviolet-cured transparent resin is solidified to form the prism lenses 103.

In use, unscattered light from the lamps 12 enters the light diffusion plate 13 and becomes scattered. The scattered light leaves the light diffusion plate 13 and enters the prism sheet 10. The scattered light then travels through the prism sheet 10 before refracted out at the prism lenses 103 of the prism layer 102. Thus, the refracted light leaving the prism sheet 10 is concentrated at the prism layer 102 and increases the brightness of the backlight module 100. The refracted light then propagates into an LCD panel (not shown) disposed above the prism sheet 10.

Figure 7:
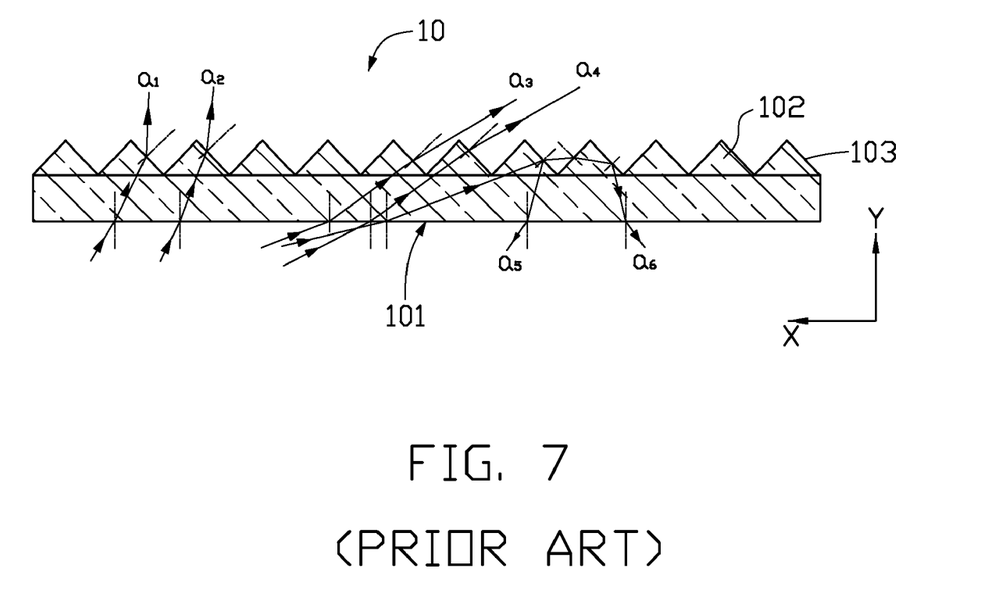
FIG. 7 is a side, cross-sectional view of the prism sheet of FIG. 5, taken along line VII-VII, showing light transmission paths.

When the light is scattered in the light diffusion plate 13, scattered light enters the prism sheet at different angles of incidence. Referring to FIG. 7, when scattered light enters the prism sheet 10 at different angles of incidence, the scattered light generally travels through the prism sheet 10 along three light paths. In the first light path (such as $a_1$, $a_2$) the light enters the prism sheet at small angles of incidence and refracts out of the prism lenses with the refracted path closer to the normal to the surface of the base layer 101. In the second light path (such as $a_3$, $a_4$) the light enters the prism sheet 10 at angles of incidence larger than the first light path and refracts out of the prism lenses 103 with the refracted path being closer to the normal to the surface of the prism lenses 103. Both the first light path and the second light path contribute to the brightness of the LED and the light utilization efficiency of the backlight module 100. However, in the case of the third light path (such as $a_5$, $a_6$), the light enters the prism sheets at angles greater than the second light path, such that when the refracted light in the third light path leaves the prism sheet 10 at the prism lenses 103 the refracted light impinges on the surface of adjacent prism lens 103 and reenters the prism sheet 10. Thus, light traveling along the third light path will eventually reenter the prism sheet 10 and may exit the prism sheet 10 on the same side the light entered. This third light path does not contribute to the light utilization efficiency of the backlight module 100. Further, the third light path may interfere with or inhibit other incident light resulting in decreasing brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface, a second surface opposite to the first surface, a plurality of spherical depressions formed in the first surface, and a plurality of triangular pyramidal depressions and hexagonal pyramidal depressions formed in the second surface. Each of the triangular pyramidal depressions is surrounded by three adjacent hexagonal pyramidal depressions.

In another aspect, a backlight module according to a preferred embodiment includes a plurality of lamps, a light diffusion plate and a prism sheet. The light diffusion plate is disposed above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
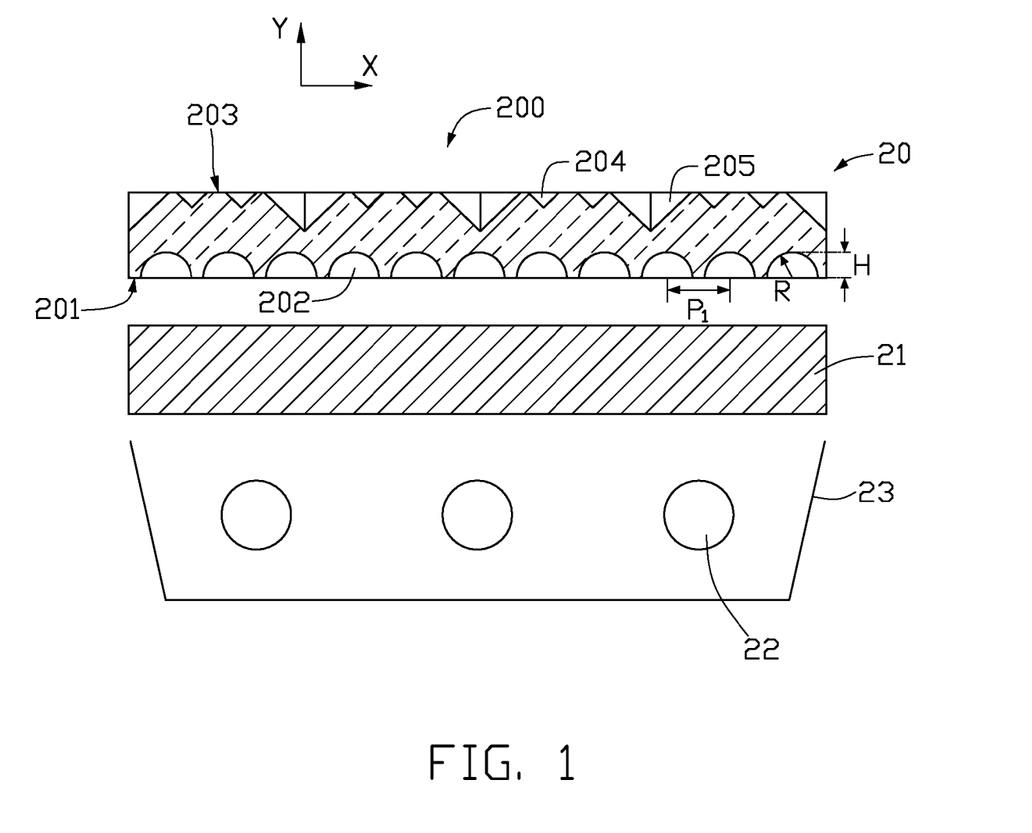
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a light diffusion plate 21, a plurality of lamps 22 and a housing 23. The lamps 22 are regularly aligned above a base of the housing 23. The light diffusion plate 21 and the prism sheet 20 are stacked on the top of the housing 23 in that order.

The prism sheet 20 includes a transparent main body. The main body includes a first surface 201, a second surface 203, a plurality of spherical depressions 202, a plurality of triangular pyramidal depressions 204 and a plurality of hexagonal pyramidal depressions 205. The first surface 201 and the second surface 203 are on opposite sides of the main body. The first surface 201 is adjacent to the light diffusion plate 23, and the second surface 203 faces away from the light diffusion plate 23. The spherical depressions 202 are formed in the first surface 201. The triangular pyramidal depressions 204 and the hexagonal pyramidal depressions 205 are formed in the second surface 203. Each triangular pyramidal depression 204 is surrounded by three adjacent hexagonal pyramidal depressions 205 correspondingly.

Figure 2:
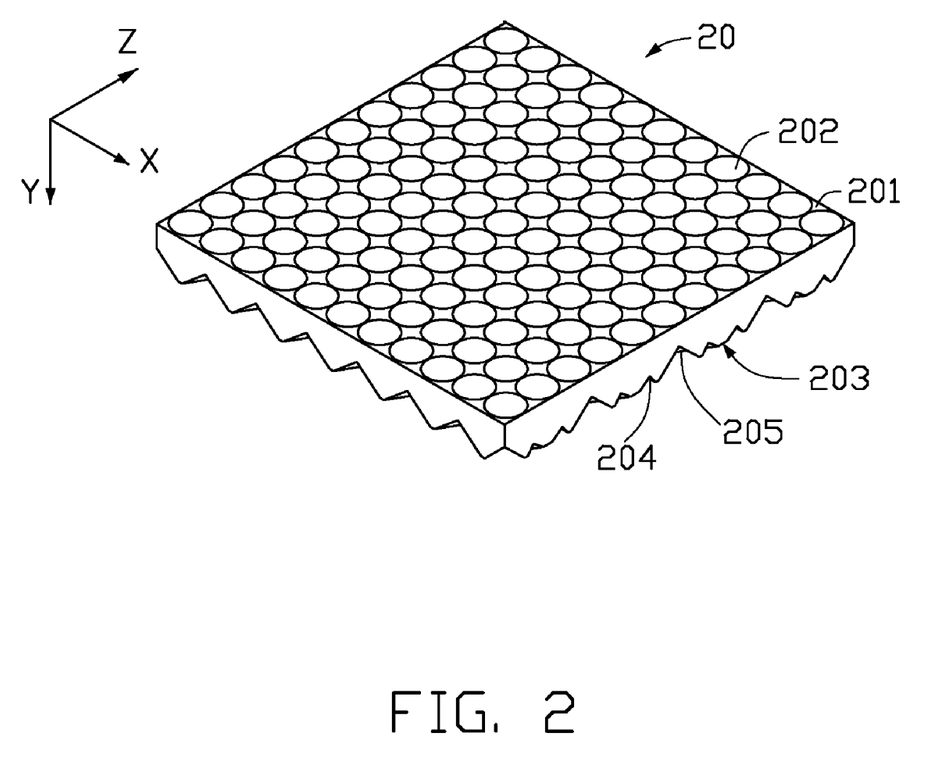
FIG. 2 is an isometric view of the prism sheet of FIG. 1, as seen from a bottom aspect.

Referring to FIGS. 1 and 2, the spherical depressions 202 are distributed on the first surface 201 in a matrix manner. The spherical depressions 202 are configured for converging incident light from the lamps 22 to a certain extent. Rows and columns of the spherical depressions 202 in the matrix are parallel to the edges of the prism sheet 20 (along an X-direction and a Z-direction) correspondingly. A pitch $P_1$ between centers of adjacent spherical depressions 202 can be configured to be in a range from about 0.025 millimeters to about 1.5 millimeters. A radius R of a sphere defined by each spherical depression 202 is in a range satisfying the following expression: $P_1/4 \leq R \leq P_1/2$. In other words, the radius R of the sphere defined by each spherical depression 202 can be in a range from about 0.01 millimeters to about 0.75 millimeters. A depth H of each spherical depression 202 is configured to be in a range satisfying the following expression: $0.01$ millimeters $\leq H \leq R$. In the first embodiment, the depth H of each spherical depression 202 is equal to the radius R. The pitch $P_1$ between adjacent spherical depressions 202 is equal to a diameter of each spherical depression 202.

Figure 3:
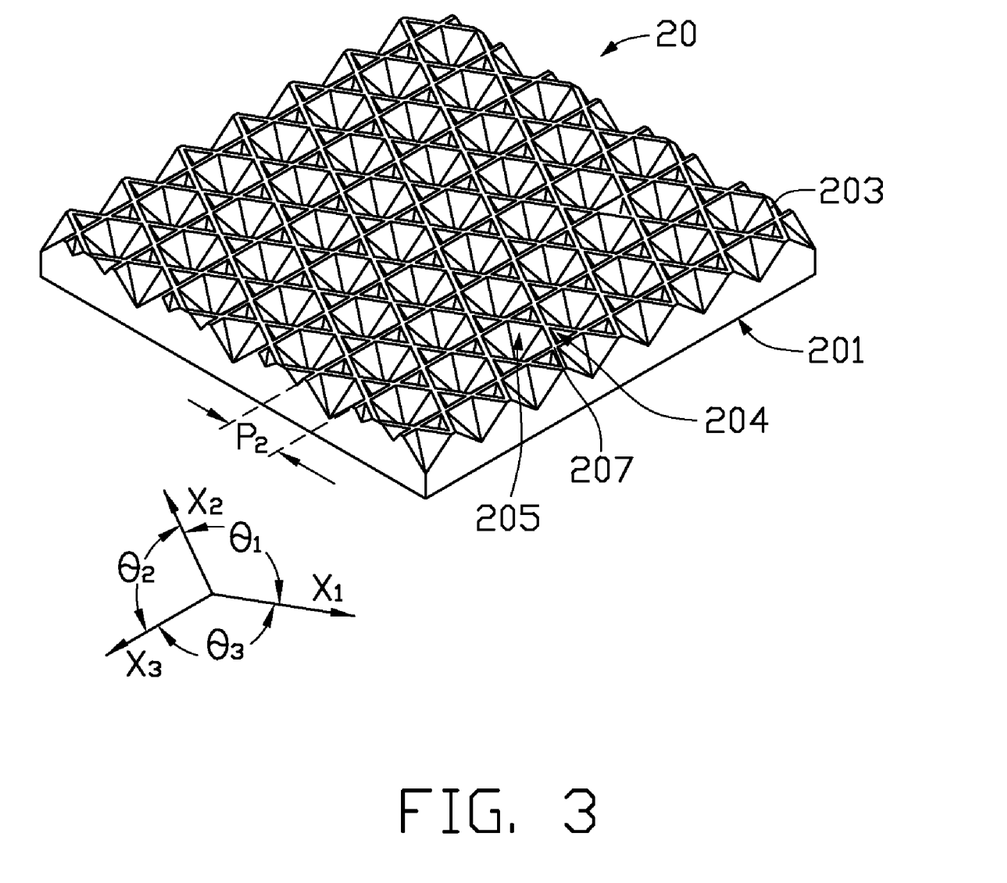
FIG. 3 is an isometric view of the prism sheet of FIG. 1, as seen from a top aspect.

Referring to FIG. 3, the distribution and structures of the triangular pyramidal depressions 204 and the hexagonal pyramidal depressions 205 are configured for converging light from the second surface 203. In this embodiment, each triangular pyramidal depression 204 is an equilateral triangular pyramid in shape. Each hexagonal pyramidal depression 205 is an equilateral hexagonal pyramid in shape. A dihedral angle defined by opposite side surfaces of each of the hexagonal pyramidal depressions can be configured to be in a range from about 50 degrees to about 120 degrees. In addition, a plurality of ridges 207 are defined by adjacent triangular pyramidal depressions 204 and hexagonal pyramidal depressions 205 correspondingly. The ridges 207 mainly extend along three directions in a same plane, such as a $X_1$-direction, a $X_2$-direction and a $X_3$-direction. Angles $\theta_1$, $\theta_2$, and $\theta_3$ defined by $X_1$-$X_2$ direction, $X_2$-$X_3$ direction, and $X_3$-$X_1$ direction can be 120 degrees correspondingly. A pitch $P_2$ between center line of adjacent ridges 207 in a same direction is in a range from 0.025 millimeters to 1 millimeter.

A thickness of the prism sheet 20 is preferably in the range from about 0.5 millimeters to about 3 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Again referring to FIG. 1, the lamps 22 can be point light sources or linear light sources, such as light emitting diodes or cold cathode fluorescent lamps. In the first embodiment, the lamps 22 are cold cathode fluorescent lamps. The housing 23 is made of metal or plastic materials. An interior of the housing 23 is configured to be highly reflective.

In the backlight module 200, when the light enters the prism sheet 20 via the first surface 201, the light is converged to a certain extent by the spherical depressions 202 of the first surface 201. Then the light is further substantially converged by the triangular pyramidal depressions 204 and hexagonal pyramidal depressions 205 of the second surface 203 when exiting the prism sheet 20. Therefore, a brightness of the backlight module 200 is increased. In addition, with the help of the triangular pyramidal depressions 204 and hexagonal pyramidal depressions 205, many or most of the light would propagate along directions closely parallel to the Y-direction. At the same time, less light would travel along directions close to the X-direction, resulting in decreasing the consumption of light energy. Accordingly, the light energy utilization rate of the backlight module 200 is increased.

Furthermore, the first surface 201 forms spherical depression 202 having curved sidewalls, thus a light receiving area of the sheet 20 is increased. Because the second surface 203 forms depressions having sidewalls expanding out of the prism sheet 20 at an angle, the angle that the light refracts out (allowing the light to exit) of the prism sheet 20 is expanded. Additionally, the slope of the sidewalls of the triangular pyramidal depressions 204 or the hexagonal pyramidal depressions 205, and also the obliqueness relative to the edge of the prism sheet 20 can have various configurations according to predetermined viewing angles requirements of the backlight module 200. The prism sheet 20 can also be orientated to obtain appropriate viewing angle thereby satisfying most of the LCD displays' requirements on horizontal and vertical viewing angles. Additionally, if the backlight module 200 is used in a liquid crystal display device, an arrangement of the triangular pyramidal depressions 204 and hexagonal pyramidal depressions 205 would be different from that of pixels of the liquid crystal display panel. Thus moiré pattern interference caused by the prism sheet 20 and the pixel pitch of the liquid crystal display panel 25 is kept minimal or eliminated.

Moreover, when compared to the conventional prism sheet, the prism sheet 20 of the present invention is integrally formed by injection molding technology. Thus, it is easier to mass-produce the prism sheet 20 via the injection molding method. Because the prism lenses of the conventional prism sheet is solidified by melted ultraviolet-cured transparent resin, the prism lenses are usually damaged or scraped due to their poor rigidity and mechanical strength. When compared to the conventional prism sheet, the prism sheet 20 has a better rigidity and mechanical strength. Therefore, the present prism sheet is not easily damaged or scratched.

Figure 4:
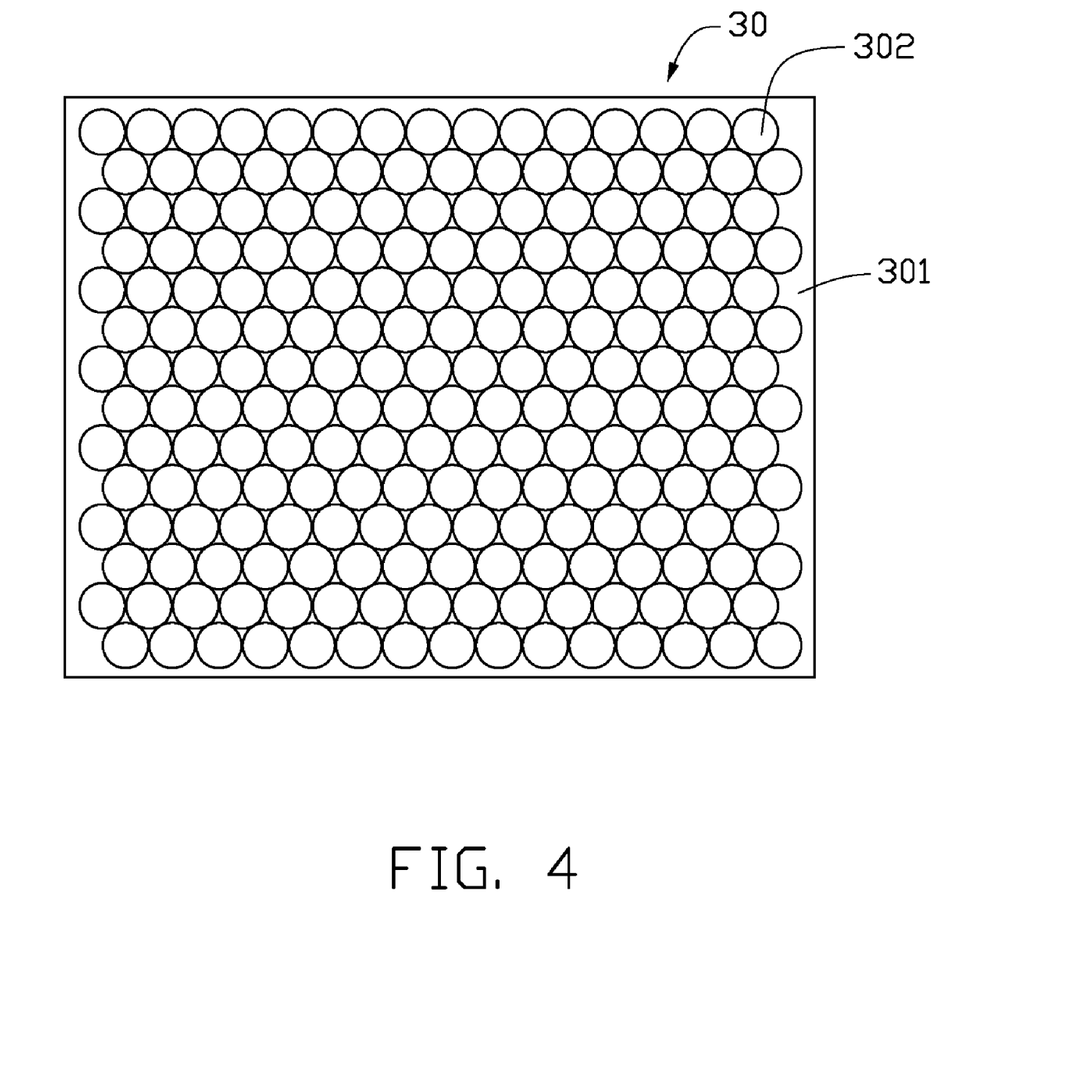
FIG. 4 is a bottom plan view of an optical plate according to a second preferred embodiment of the present invention.

Referring to FIG. 4, a prism sheet 30 in accordance with a second preferred embodiment of the present invention is shown. The prism sheet 30 is similar in principle to the prism sheet 20. However, spherical depressions 302 are aligned side by side on a first surface 301 of the prism sheet 30 in rows. Adjacent spherical depressions 302 in each row adjoin each other. The spherical depressions 302 in any two adjacent rows are staggered relative to each other and abut each other. Thus a matrix comprised of offset rows of the spherical depressions 302 is formed. In other words, a honeycomb pattern of the spherical depressions 302 is formed.

It is noted that the scope of the present prism sheet and backlight module is not limited to the embodiments described above. For example, in the prism sheet 20, the spherical depressions 202 can be aligned apart, be arranged randomly or be arranged symmetrically relative a center of the prism sheet 20. The rows and the columns of the spherical depressions 202 in the matrix can be aligned obliquely to the edges of the prism sheet 20. The triangular pyramidal depressions 204 and hexagonal pyramidal depressions 205 can be aligned apart.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
a transparent main body having:
a first surface,
a second surface opposite to the first surface,
a plurality of spherical depressions formed in the first surface; and
a plurality of triangular pyramidal depressions and hexagonal pyramidal depressions formed in the second surface, each of the triangular pyramidal depressions surrounded by three adjacent hexagonal pyramidal depressions.

2. The prism sheet according to claim 1, wherein a pitch between adjacent spherical depressions is in a range from about 0.025 millimeters to about 1.5 millimeters.

3. The prism sheet according to claim 1, wherein a radius of each spherical depression is in a range from about 0.01 millimeters to about 0.75 millimeters.

4. The prism sheet according to claim 1, wherein a depth of each spherical depression is equal to or greater than about 0.01 millimeters and equal to or less than a radius of each spherical depression.

5. The prism sheet according to claim 1, wherein the spherical depressions are distributed at the first surface in a matrix manner.

6. The prism sheet according to claim 1, wherein each triangular pyramidal depression is an equilateral triangular pyramid in shape, and each hexagonal pyramidal depression is an equilateral hexagonal pyramid in shape.

7. The prism sheet according to claim 1, wherein a dihedral angle defined by opposite side surfaces of each of the hexagonal pyramidal depressions is configured to be in a range from about 50 degrees to about 120 degrees.

8. The prism sheet according to claim 1, wherein a thickness of the prism sheet is in a range from about 0.5 millimeters to about 3 millimeters.

9. The prism sheet according to claim 1, wherein the prism sheet is made of transparent material selected from the group consisting of polycarbonate, polymethyl methacrylate, polystyrene, copolymer of methylmethacrylate and styrene, and any combination thereof.

10. A backlight module comprising:
a plurality of lamps;
a light diffusion plate disposed above the lamps; and
a prism sheet disposed on the light diffusion plate, the prism sheet includes a transparent main body having
a first surface,
a second surface opposite to the first surface, and
a plurality of spherical depressions formed in the first surface; and
a plurality of triangular pyramidal depressions and hexagonal pyramidal depressions formed in the second surface, each of the triangular pyramidal depressions surrounded by three adjacent hexagonal pyramidal depressions.

11. The backlight module according to claim 10, wherein the first surface of the prism sheet faces the light diffusion plate.

12. The backlight module according to claim 10, wherein a pitch between adjacent spherical depressions is in a range from about 0.025 millimeters to about 1.5 millimeters.

13. The backlight module according to claim 10, wherein a radius of each spherical depression is in a range from about 0.01 millimeters to about 0.75 millimeters.

14. The backlight module according to claim 10, wherein a depth of each spherical depression is equal to or greater than about 0.01 millimeters and equal to or less than a radius of each spherical depression.

15. The backlight module according to claim 10, wherein the spherical depressions are distributed at the first surface in a matrix manner.

16. The backlight module according to claim 10, wherein each triangular pyramidal depression is an equilateral triangular pyramid in shape, and each hexagonal pyramidal depression is an equilateral hexagonal pyramid in shape.

17. The backlight module according to claim 10, wherein a dihedral angle defined by opposite side surfaces of each of the hexagonal pyramidal depressions is configured to be in a range from about 50 degrees to about 120 degrees.

18. The backlight module according to claim 10, wherein a thickness of the prism sheet is in a range from about 0.5 millimeters to about 3 millimeters.

* * * * *